United States Patent Office 2,863,880
Patented Dec. 9, 1958

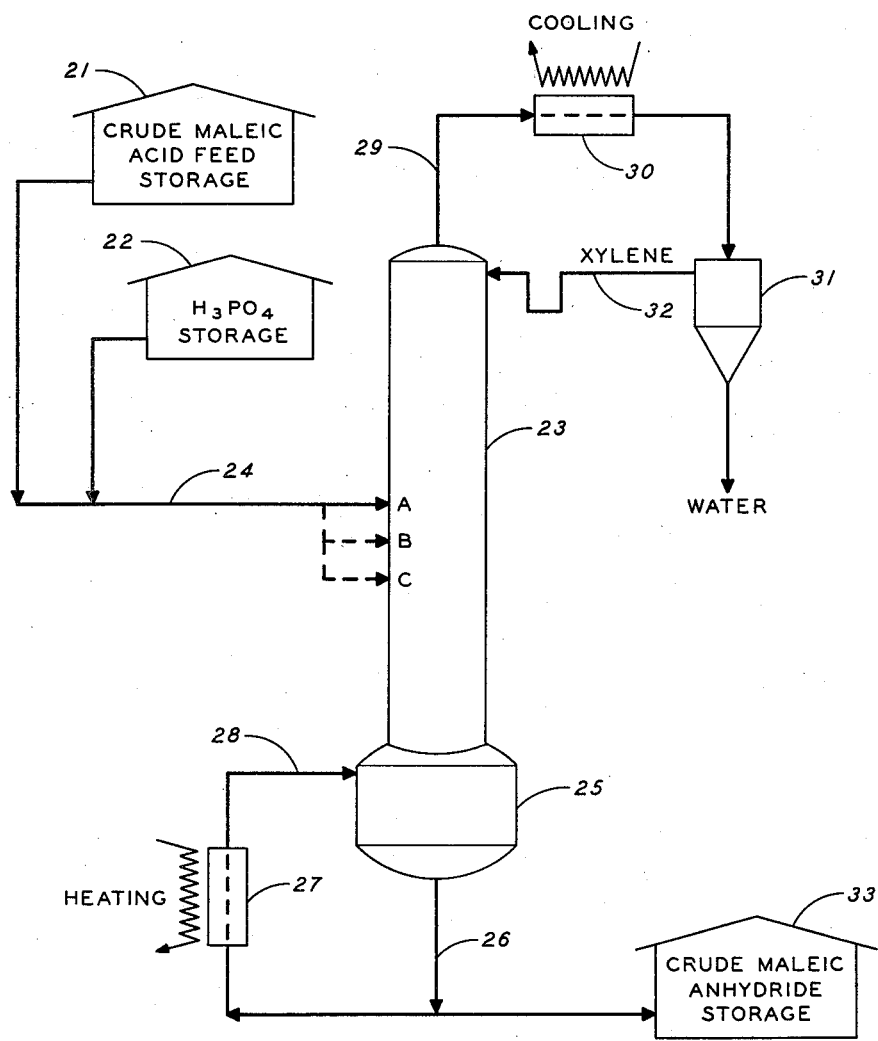

2,863,880

CONTINUOUS DEHYDRATION OF AQUEOUS SOLUTIONS OF CRUDE MALEIC ACID

Gustave K. Kohn, Oakland, Calif., assignor to California Spray-Chemical Corporation, Richmond, Calif., a corporation of Delaware Application July 23, 1957, Serial No. 674,994

10 Claims. (Cl. 260—346.8)

This invention relates to an improved continuous process for converting the maleic acid content of aqueous solutions of crude or impure maleic acid to maleic acid anhydride without appreciable decomposition of the maleic anhydride and a minimum of isomerization to fumaric acid.

In the catalytic vapor phase oxidation of organic compounds containing at least 4 carbon atoms, maleic anhydried is produced as a primary or secondary oxidation product, depending upon the type of organic compounds oxidized. The gaseous oxidation products may be processed and recovered by a variety of methods, and generally include an aqueous absorption system, in whole or in part, to yield a product or by-product aqueous stream containing maleic acid. Where the primary oxidation product is maleic anhydride, the aqueous product stream contains a high concentration of maleic acid which may be crystallized to recover the gross maleic acid and yield a residual stream of low maleic acid content associated with residual oxidation products. Again, where maleic anhydride is an incidental oxidation product, the aqueous absorption stream likewise contains the comparatively low concentration of maleic acid associated with multiple residual oxidation products.

The difficulties in recovery of the maleic anhydride and particularly from the residual or by-product aqueous streams have long been recognized in the prior art. In general practice, aqueous by-product streams containing less than 40% maleic acid have been discarded into sewage. The conventional methods of recovery are rendered ineffective or totally inoperative by reason of the heterogeneous composition and concentration of the associated impurities which will vary with the charge and reaction variables of the oxidation process, as well as the operating variables of the primary recovery system.

One of the more effective processes for converting maleic acid from concentrated aqueous solutions thereof to maleic anhydride with a minimum of isomerization to fumaric acid is a process involving the codistillation with an aromatic solvent at elevated temperatures such that the maleic acid is dehydrated to maleic anhydride and the water of solution and hydrate water are removed overhead as a binary mixture with the aromatic solvent while retaining the maleic anhydride in the still bottoms. This process, while of merit in the conversion of maleic acid from primary recovery streams with high concentrations of maleic acid and minimal concentrations of associated impurities, has been found substantially inoperative when applied to by-product or residual aqueous maleic acid streams by reason of the appreciable concentrations of associated oxidation products and the presence of alkali metal cations. The associated oxidation products increase the reflux temperature of the maleic anhydride and, accordingly, the temperature at which complete dehydration or decomposition of the maleic acid is effected. These temperatures may vary from 200° to 230° C., depending upon the concentration of associated oxidation products. On the other hand, it has been established that maleic anhydride decomposes with the evolution of carbon dioxide at elevated temperatures in the presence of relatively small concentrations of alkali metal salts. This decarboxylation reaction, catalyzed by the presence of alkali metal cations, is a rate reaction which proceeds quite slowly at temperatures as low as about 150° C., but rapidly increases in rate with increasing temperatures, and, at temperatures above 200° C., proceeds violently with almost instantaneous decomposition. Additionally, the presence of water increases the rate of decarboxylation over that of the dry salts.

The alkali metal cations are normally introduced through the water employed in the recovery system and are concentrated by the inherent evaporation and cycling of the absorption stream. Generally, for every volume of water remaining in the absorption stream, 15 volumes of water disappear as vapor during the absorption of the gaseous oxidation products. It is readily apparent that, even when employing waters containing a low concentration of alkali metal cation as the absorbing medium for the absorption system, or even employing an ion exchange trap in the feed water, the concentration due to inherent evaporation raises the alkali metal content to a level sufficient to effect a material decomposition of maleic anhydride in a continuous dehydration and recovery system.

The foregoing difficulties, attendant the recovery of maleic anhydride from aqueous solutions of crude maleic acid, and particularly residual or by-product aqueous maleic acid solutions containing associated oxidation products, have now been overcome by the development of a continuous conversion and dehydration process which permits continuous distillation of gross and hydrate water while maintaining a distilland or liquid phase distillation bottoms temperature above 200° C., even in the presence of alkali metal cations, without appreciable decomposition of maleic anhydride.

The achievement of a continuous conversion and dehydration process with continuous or intermittent recovery of maleic anhydride is permitted by the incorporation in the crude aqueous maleic acid feed containing alkali metal cations of a minor proportion of a water-soluble oxygen acid of pentavalent phosphorus. This unique recovery is predicated upon the discovery that the decomposing effect of alkali metal cations on maleic anhydride may be substantially quantitatively inhibited by the presence of an oxygen acid of pentavalent phosphorus, as well as the progenitors of such acid, when present in controlled amounts in excess of at least one equivalent acid group (OH) per atomic equivalent of alkali metal ion.

In order to effect the desired inhibition of the alkali metal-induced decomposition, the phosphoric acid is necessarily an oxygen acid of pentavalent phosphorus which contains at least one free acid group (OH), such as the free ortho-, meta-, pyro- or polyphosphoric acids, or their partial esters and salts. Additionally, the progenitors of these acids, which, under the conditions of application such as the introduction into an aqueous solution and the hydrolyzing and/or dehydrating conditions of the maleic acid dehydration process, will produce an oxygen acid of pentavalent phosphorus as illustrated by phosphorus pentoxide, etc., may be employed as the inhibiting agent.

In the practical operation of the inhibition process, it is preferred to utilize the free phosphoric acid or polyphosphoric acid as the inhibiting agent. However, there exist certain advantages in the use of the partial esters of phosphoric acid such as the mono- and diesters of orthophosphoric acid and preferably the mono- and dialkyl phosphoric acids as the inhibitor, particularly in situations where corrosion problems may be a deterrent in the use of the free or unsubstituted phosphoric acid.

As previously indicated, it has been established that maleic anhydride will decompose in the presence of relatively small concentrations of alkali metal ions. As further indicated, this decomposition is a rate reaction and is directly proportionate to the concentration of alkali metal ion, temperature, and contact time.

In order to obtain maximum efficiency of the dehydration process, the optimum temperature of operation is at the reflux temperature of maleic anhydride or the dehydrated product of the crude maleic acid solution. This operating temperature is approximately 200° C. or higher, depending upon the concentration of associated oxidation products. At these temperatures of reflux, the decomposing or decarboxylating effect of the associated alkali metal cations is most pronounced.

It has been observed that a concentration of sodium ion of about 15 p. p. m., when refluxed with maleic anhydride for 12 hours, will result in about a 5% decomposition of the maleic anhydride. However, for practical operations such as in commercial systems, the pronounced decomposition effect is particularly noted in the dehydration of maleic acid solutions containing at least 50 p. p. m. of alkali metal ion based on the maleic acid content. Above this concentration of alkali metal cation, the decomposing effect is a material factor in the yield and recovery of maleic anhydride and requires drastic conditions, such as lower temperatures and short residence time, in order to minimize the decomposition of the maleic anhydride.

For the purpose of inhibiting the decomposition of maleic anhydride in accordance with the invention, the oxygen acid of pentavalent phosphorus is incorporated in controlled amounts correlated with the concentration of alkali metal cation. As previously indicated, this inhibition is effected by incorporating the phosphoric acid in amounts necessary to supply at least one equivalent acid group (OH) per atomic equivalent of alkali metal ion, and preferably in amounts of at least three equivalent acid groups per atomic equivalent of alkali metal ion or, in terms of orthophosphoric acid, at least a mole ratio of one. Again, for practical purposes, the maximum observed inhibition is attained with about six to eight equivalent acid groups per atomic equivalent of alkali metal ion and, although increased quantities of inhibitor may be employed, no further advantage has been observed.

The crude maleic acid feed so compounded with the water-soluble acid of pentavalent phosphorus is introduced into contact with a body of water-immiscible, inert, organic liquid, at least a portion of which possesses a boiling point in the range of 110° to 185° C., which is maintained at a temperature above the codistillation temperature of said liquid with water, and distilling from the maleic acid solution the gross and combined water of hydration as a codistillation mixture with said organic liquid. During the course of this extraction process, the maleic acid is dehydrated to maleic anhydride which is collected in the distilland or distillation bottoms along with the associated solids from the maleic acid feed. These dehydrated solids or crude maleic anhydride may be withdrawn continuously or intermittently from the reboiler in the distillation column and the maleic anhydride may be separated and recovered through conventional vacuum distillation as an overhead fraction while retaining associated oxidation products in the residue.

Although the subject process may be applied to the continuous conversion of aqueous maleic acid solutions in the presence of alkali metal cations, it is particularly adaptable to aqueous maleic acid feeds containing at least 15% associated oxidation products, based on the maleic content, which require a reboiler temperature of at least 200° C. in the distillation bottoms to effect reflux of the dehydrated solids and assure complete dehydration.

For optimum efficiency in extraction of the gross and hydrate water while minimizing isomerization to fumaric acid, the compounded maleic acid feed is introduced into the vapor phase zone of the distillation column at a point which is substantially the equilibrium concentration position of the column. This position of the feed point is dependent upon the concentration of the crude maleic acid solution and will vary with changes in maleic acid concentration of the feed. At equilibrium, the distilland of the column will comprise a body of maleic anhydride associated with higher boiling components, which is maintained at reflux temperatures. The vapor phase portion of the column, or that portion of the distillation or dehydration column above the reboiler, will contain varying concentrations of the distilland in combination with the water-entraining agent, which is preferably a water-immiscible, inert, aromatic solvent, at least a portion of which possesses a boiling point in the range of 110° to 185° C. This water-entraining agent may be a narrow-boiling, aromatic solvent such as xylene, toluene and the like, or the entraining agent may be a mixture of solvents containing at least one component boiling in the range of 110° to 185° C. as, for example, a mixture of benzene and orthodichlorobenzene. The exact composition at any point in the column corresponds to the proportions dictated by the principles of distillation equilibrium.

In the accompanying Figure 1 is presented a schematic diagram of an illustrative embodiment of the invention process. The operation of the process will be outlined as it is applied to an exemplary feed obtained as a residual aqueous stream resulting from the catalytic vapor phase oxidation of an orthoxylene feed after recovery of phthalic anhydride and phthalic acid. A typical analysis of the solid organic constituents of such residual stream is as follows:

*Analysis on dry basis*

| | Percent |
|---|---|
| Maleic anhydride (calculated from acid) | 62.2 |
| Phthalic anhydride | 5.8 |
| Fumaric acid | 1.0 |
| Associated organics (aldehydes, ketones, acids, phenols, quinones, etc.) | 32.0 |

Depending upon the operating variables in the phthalic acid recovery system, the concentration of the maleic acid in the residual aqueous stream will usually vary from about 10 to 35% by weight.

The aqueous component of the residual streams contains varying concentrations of alkali metal cations, again depending upon the operating variables of the primary and secondary recovery system. A typical analysis of the cations in a residual aqueous maleic acid stream which contained 34% solids is as follows:

| | P. p. m. |
|---|---|
| Na | 400 |
| Al | 4 |
| Ca | 240 |
| Cr | 28 |
| Cu | 2 |
| Fe | 200 |
| Pb | 11 |
| Mg | 90 |
| Mn | 4 |
| Ni | 15 |
| Si | 18 |
| V | 7 |

Aside from the cations normally present in the water, other cations are undoubtedly introduced in the absorbing medium from sources such as corrosion, catalysts, air pollutants, etc.

The residual or crude aqueous maleic acid feed, which may be supplied directly from the aqueous recovery system, or from a storage tank 21, is compounded or blended with controlled amounts of a water-soluble acid of penta-valent phosphorus such as 85% orthophosphoric acid from storage tank 22. The amount of orthophosphoric acid is dependent upon the concentration of alkali metal cations in the crude maleic acid feed and is preferably injected into the feed in such quantities as would be theoretically in excess of the amount necessary to combine with the metal cations to produce an acid phosphate or, in other words, a ratio of at least three acid groups per atomic equivalent of metal cation.

The phosphoric acid-compounded feed is then metered into the vapor phase zone of dehydration column 23 through line 24 at a controlled rate. For optimum conversion and dehydration efficiency with a minimum of isomerization, the feed point A into the dehydration column is preferably located at substantially the equilibrium position of the column when the process has reached steady-state operation. The location of the optimum feed point is dependent upon the maleic acid concentration and, in general, should be approximately 20 plates above the reboiler for a 25% maleic acid feed stock. For more concentrated charge stock, the feed point may be located further down the column as in feed points B and C in accordance with the maleic acid concentration of the charge.

At steady-state operation, the dehydration column 23 contains a distilland or liquid phase bottoms in the reboiler section 25 which is maintained at a temperature in the range of about 200° to 230° C., depending upon the concentration of associated solids in the maleic acid feed. The distilland comprises a body of maleic anhydride and dehydrated solids from the maleic acid feed which is maintained at reflux temperatures through a reboiler arrangement involving draw-off line 26, external heat exchanger 27, and entry line 28.

The dehydration column 23 may be of conventional design with adequate temperature control to maintain efficient reflux fractionation within the column and to allow a practical feed rate with rapid overhead draw-off of the binary water-xylene mixture. Preferably, the distillation or dehydration column should be a packed or bubble-type column containing at least about 35 plates.

The phosphoric acid-treated feed may be introduced at ambient temperatures, although it is preferably preheated to about 80° to 110° C. The rate at which the feed is introduced into the dehydration column is so adjusted and maintained such that it is not substantially greater than the rate of conversion of maleic acid to maleic anhydride in the column or, in other words, at a rate such that substantially complete dehydration of maleic acid is effected prior to its contact with the distilland of the column. Ordinarily, the temperatures immediately below the feed point will fluctuate in the range of 140° to 170° C., and the vapor temperature at the top of the column is desirably maintained at the co-distillation temperature of the water-solvent mixture which, in the case of xylene, is about 93° to 100° C. With adequate fractionation in the upper part of the dehydration column, overhead loss of maleic acid can be held to less than 1% based on water removed. The binary xylene-water vapor is drawn off overhead through the vapor and draw-off line 29 which then passes through condenser 30 and is separated into its components in water separator 31, wherein the xylene solvent is recovered and recycled to the top of the dehydration column through line 32.

The recovery of crude maleic anhydride may be accomplished intermittently or continuously by bleeding the draw-off line 26 and introducing the product into an intermediate storage 33, pending further processing. A typical analysis of the crude maleic anhydride product obtained from the subject process is as follows:

| | Percent |
|---|---|
| Maleic anhydride | 64.0 |
| Phthalic anhydride and other distillables | 19.8 |
| Nondistillables, including fumaric acid [1] | 16.2 |

[1] Almost all the nondistillables dissolved in water indicating fumaric acid content was low. Hot water and caustic removed total impurities.

Depending upon the amount of associated oxidation products and impurities in the crude maleic anhydride product, it may be desirable to incorporate a filtration step prior to intermediate storage and eventual purification. The purpose of this step would be to remove most of the fumaric acid, phthalic anhydride and other solid contaminants and thereby facilitate the rectification of the maleic anhydride. This may be accomplished by cooling the crude maleic anhydride product to about 50° to 60° C. and passing the slurry through a series of plate and frame filters. After recovery of the crude maleic anhydride filtrate, the fumaric acid and extraneous solids in the filter residue may be washed with xylene to recover the last traces of maleic anhydride and the wash filtrate returned to the dehydration column. In either event, the maleic anhydride may be purified and recovered by conventional vacuum distillation.

As a specific example of the operation of the subject process, a 55-hour continuous dehydration run was made employing the residual recovery stream from a phthalic acid recovery system as the feed. The equipment employed consisted of a 1-gallon, 304 stainless reboiler equipped with 3600-watt Calrod heater. The dehydration column was 3 feet of 3-inch packed glass pipe below the feed point and 2 feet of 2-inch packed glass pipe between the feed and the reflux return. A 304 stainless condenser and water separator was used to continuously separate and remove the water.

At the start of the run, the reboiler was charged with 1195 grams of pure maleic anhydride and a small amount of xylene. The reboiler was then heated until the temperature at the feed point reached 180° C. The aqueous maleic acid feed possessed a specific gravity of 1.09 and contained 34% solids, of which 23% was maleic acid. This feed was compounded with 85% phosphoric acid with a specific gravity of 1.69 which was incorporated at a concentration of 0.4% by volume.

The treated feed was metered into the dehydration column continuously at a rate of approximately 10 milliliters/minute, and the water taken overhead was separated and removed with the recovered xylene being recycled to the system. Crude, molten maleic anhydride was removed periodically from the bottom of the reboiler. This product was a free-flowing, black liquid and drained freely from the reboiler.

The overhead water was titrated to determine the amount of acid lost. It was determined that the overhead loss of acid was found to be a function of the vapor temperature and, when the vapor temperature was 95° to 99° C., the overhead water contained less than 1% acid. There was practically no build-up of solids in the column, and after shutdown the column hold-up was found to be mainly maleic acid or anhydride as shown by its solubility in water.

27,360 milliliters of the crude maleic acid solution were fed to the dehydration column, and the following materials balance was obtained:

| Dehydrated solids in: | Grams |
|---|---|
| Initial charge of pure maleic anhydride | 1,198 |
| Solids from crude feed stock | 9,076 |
| Solids from phosphoric acid addition | 114 |
| Total dehydrated solids in | 10,388 |

Dehydrated solids out:
- Samples from reboiler during run _____ 9,150
- Final draw-off from reboiler _____ 300
- Column packing hold-up, solubles _____ 389
- Column packing hold-up, insolubles _____ 65
- Xylene reflux system hold-up _____ 51
- Loss in overhead water _____ 412
- Estimated spillage and leakage from feed pump _____ 21

Total dehydrated solids out _____ 10,388

In this run, the recovery of maleic anhydride was substantially quantitative with less than about 3% of the maleic acid being isomerized to fumaric acid and with negligible decomposition of maleic anhydride by reason of the presence of the alkali metal cations.

During the course of this run, periodic reflux temperature readings were taken and reboiler samples analyzed. Correlations thereof are as follows:

| Time | Reboiler Temp. At Reflux, °C. | Approximate Percent Maleic Anhydride From Feed in Reboiler |
|---|---|---|
| Start | 204 | 0 |
| 4 hours | 214 | 45 |
| 9 hours | 217 | 57 |
| 15½ hours | [1] 220 | 85 |
| 22 hours | 221 | 92 |
| 31 hours | 220 | 97.5 |
| 49 hours | 222 | >99.7 |

[1] The boiling point remained constant once equilibrium had been reached, approximately after 85% of the original maleic anhydride had been replaced.

In contrast to the foregoing continuous dehydration run, which illustrates the unique inhibiting effect of a water-soluble acid of phosphorus upon the alkali metal decarboxylation of maleic anhydride, a number of comparative runs were made under the same conditions employing an untreated maleic acid feed. As in the foregoing example, the feed contained 34% solids, of which 23.5% was maleic acid, and the aqueous component contained 400 p. p. m. of sodium ion with 1000 p. p. m. of total cations. The reboiler section was initially charged with pure maleic anhydride and xylene, and the dehydration process was conducted under the same conditions as in the previous example, except for the incorporation of phosphorus acid in the feed, with periodic temperature measurements and sample withdrawal from the reboiler. In this instance, the following correlation of data was obtained:

| Time | Reboiler Temp. At Reflux, °C. | Approximate Percent Maleic Anhydride From Feed in Reboiler |
|---|---|---|
| Start | 200 | 0 |
| 7 hours | 205 | 20 |
| 10 hours | 209 | 36 |
| 11½ hours | 231 | 40 |
| 12½ hours | 264 | 40+ |

The sharp rise in temperature after 11½ hours' operation occured even after external heat had been withdrawn and as the result of the catalytic breakdown of the anhydride. Apparently, the catalytic decomposition is slow until appreciable concentrations of sodium ion are built up in the distilland. Under the conditions of the process, a certain period of time is required to concentrate the alkali metal ions in the reboiler section.

In another run, a different feed, obtained as a residual recovery stream from a phthalic acid recovery system, was employed. This feed, which contained 11% maleic acid and at least 15% of associated oxidation products based on the maleic content and contaminated with metal cations, was concentrated to about 30% maleic acid content by submerged combustion. This feed was fed into the dehydration column as previously and resulted in a gross breakdown in about 10 hours' operation. In other instances, complete breakdown was obtained in operations running from 2 to 12 hours, depending upon the type of equipment employed.

The unique inhibiting effect of the water-soluble acid of phosphorus on the catalytic decomposition of maleic anhydride has been illustrated in laboratory experiments. In these experiments, 100 grams of maleic anhydride, 1 gram of sodium chloride, and varying quantities of inhibitor were heated to reflux temperature and maintain at reflux until gross decomposition was obtained as evidenced by appreciable rise in reflux temperature. In the following experiments, 85% orthophosphoric acid was compared with concentrated sulfuric acid (98%) and the results obtained are as follows:

EFFECT OF $H_3PO_4$ ON DECOMPOSITION

| Milliliters 85% $H_3PO_4$ | Hours Reflux Observed Before Gross Decomposition |
|---|---|
| 0.000 | 2 |
| 0.0625 | 6 |
| 0.125 | 9 |
| 0.25 | >50 |
| 0.5 | >50 |
| 1.0 | >50 |

EFFECT OF CONCENTRATED $H_2SO_4$ (98%) ON DECOMPOSITION

| Milliliters $H_2SO_4$ | Hours Reflux Observed Before Gross Decomposition |
|---|---|
| 0.000 | 2 |
| 0.0325 | 9 |
| 0.125 | 11 |
| 0.25 | 12 |
| 0.5 | 12 |
| 1.0 | 14 |

Under similar conditions, p-toluene sulfonic acid resulted in the complete breakdown of maleic anhydride in about 3 to 4 hours.

In another series of experiments, one-tenth of a gram of sodium chloride was heated with 100 grams of maleic anhydride to reflux temperature and maintained at reflux until gross decomposition was observed. The control in this series resulted in gross decomposition at 8 hours. In the parallel experiments employing varying types of phosphates and phosphoric acids, 0.236 gram of commercial polyphosphoric acid was run for 49 hours without decomposition, and 0.526 gram of diethyl phosphoric acid was run 31 hours without decomposition, at which time the experiments were halted. However, 1.26 grams of tricresyl phosphate, illustrative of a neutral phosphate ester, provided no improvement over the control and resulted in gross decomposition at 8 hours.

In the foregoing references to the alkali metal-induced decomposition of maleic anhydride, the observed gross decomposition, as measured by appreciable rise in reflux temperature, has been used as the basis for comparison. In correlating these observations and data in respect to quantitative decomposition of maleic anhydride, it was ascertained that gross decomposition as observed in the foregoing data corresponds to a quantitative decomposition of maleic anhydride of at least 80% by weight.

Further experiments were conducted to quantitatively determine the amount of decomposition of maleic anhydride with varying reflux times and concentrations of sodium ions, and the inhibiting effect of an oxygen acid of pentavalent phosphorus at varying concentration ratios. In these experiments, 25 grams of technical maleic anhydride and the requisite quantities of sodium chloride (reagent grade) were placed in a 100 milliliter flask fitted with thermometer well and reflux condenser. The contents were then heated under reflux. The reflux temperature was 198°–199° C., except when the decomposition had become extensive the temperature rose sharply.

In accordance with this procedure, the following experimental data were obtained. The percent decomposed represents the difference between the original charge and the amount of maleic anhydride recovered and analyzed as sodium hydrogen maleate.

| Reflux Time (Hours) | p. p. m. Sodium Ion Added | Percent Decomposed |
|---|---|---|
| 0.33 | 3,930 | 3.7 |
| 0.67 | 3,930 | 12.6 |
| 1 | 3,930 | 23.3 |
| 1 | 393 | 7.7 |
| 2 | 393 | 29.6 |
| 4 | 393 | 47.3 |
| 6 | 393 | 87.0 |
| 2 | 50 | 4.0 |
| 4 | 50 | 8.5 |
| 7 | 50 | 12.8 |
| 12 | 50 | 25.5 |

In parallel experiments, orthophosphoric acid in varying concentrations was incorporated. The amount of orthophosphoric acid incorporated was determined in accordance with varying ratios of equivalent acid group (OH) per atomic equivalent of sodium ion.

| Reflux Time (Hours) | p. p. m. Sodium Ion Added | Equivalent OH/Sodium Ion | Percent Decomposed |
|---|---|---|---|
| 12 | 393 | 21 | 2.0 |
| 12 | 393 | 6 | 1.2 |
| 12 | 393 | 3 | 4.1 |
| 12 | 393 | 2 | 5.3 |
| 12 | 393 | 1 | 10.2 |

This application is a continuation-in-part of my application Serial No. 506,777, now abandoned, filed May 9, 1955, entitled, "Continuous Dehydration of Aqueous Solutions of Crude Maleic Acid."

Obviously, many modifications and variations of the invention as hereinbefore set forth may be made without departing from the spirit and scope thereof, and therefore only such limitations should be imposed as are indicated in the appended claims.

I claim:

1. A process for dehydrating maleic acid associated with at least 50 p. p. m. of alkali metal cation to maleic anhydride without appreciable decomposition of maleic anhydride, which comprises incorporating with said maleic acid a minor proportion of an oxygen acid of pentavalent phosphorus in amounts of at least one equivalent acid group per atomic equivalent of alkali metal cation, and subjecting the compounded maleic acid to dehydrating conditions and recovering the resultant maleic anhydride.

2. The process according to claim 1, wherein the oxygen acid of pentavalent phosphorus is orthophosphoric acid.

3. The process of claim 1, wherein the amount of oxygen acid of pentavalent phosphorus incorporated with said maleic acid is at least three equivalent acid groups per atomic equivalent of alkali metal cation.

4. A process for converting an aqueous solution of maleic acid containing alkali metal cations to maleic anhydride without appreciable decomposition of maleic anhydride, which comprises incorporating into an aqueous solution of maleic acid containing alkali metal cations a minor proportion of a water-soluble oxygen acid of pentavalent phosphorus, introducing said compounded maleic acid solution into contact with a body of water-immiscible, inert, organic liquid, at least a portion of which possesses a boiling point in the range of 110° to 185° C., maintaining said inert organic liquid at a temperature above the codistillation temperature of said liquid with water, distilling from said maleic acid solution the gross and combined water of hydration as a codistillation mixture with said inert organic liquid, and recovering the resultant maleic anhydride from the body of inert organic liquid.

5. A continuous process for converting an aqueous solution of crude maleic acid to maleic anhydride without appreciable decomposition of maleic anhydride, which comprises incorporating into an aqueous solution of maleic acid containing alkali metal cations a water-soluble oxygen acid of pentavalent phosphorus in an amount such as to present at least one equivalent acid group for each atomic equivalent of alkali metal cation in said crude maleic acid solution, continuously introducing said compounded maleic acid solution into the vapor phase zone of a distillation column in contact with a water-immiscible, inert, aromatic solvent, at least a portion of which possesses a boiling point in the range of 110° to 185° C., maintaining the distilland of said distillation column comprising a body of maleic anhydride at a temperature of 200° to 230° C., continuously distilling from said maleic acid solution the gross and hydrate water as a codistillation mixture with said aromatic solvent, maintaining a feed rate of maleic acid solution into said distillation column at a rate such that substantially complete dehydration of maleic acid is effected prior to contact with said distilland, continuously removing said water-aromatic solvent codistillation mixture from the distillation column, separating water and recycling aromatic solvent to said distillation column, and recovering maleic anhydride from said distilland.

6. A continuous process for converting an aqueous solution of crude maleic acid to maleic anhydride without appreciable decomposition of maleic anhydride, which comprises incorporating into an aqueous solution of maleic acid containing alkali metal cations a water-soluble oxygen acid of pentavalent phosphorus in an amount sufficient to present at least one equivalent acid group per atomic equivalent of alkali metal cation, continuously introducing said compounded maleic acid solution into the vapor phase zone of a distillation column in contact with xylene, maintaining the distilland of said distillation column comprising a body of maleic anhydride at a temperature of 200° to 230° C., continuously distilling from said maleic acid solution the gross and hydrate water as a codistillation mixture with said xylene, maintaining a feed rate of maleic acid solution into said distillation column at a rate such that substantially complete dehydration of maleic acid is effected prior to contact with said distilland, continuously removing said water-xylene codistillation mixture from the distillation column, separating water and recycling xylene to said distillation column, and recovering maleic anhydride from said distilland.

7. A continuous process for converting an aqueous solution of crude maleic acid to maleic anhydride without appreciable decomposition of maleic anhydride, which comprises incorporating into an aqueous solution, containing from 10 to 40% by weight of maleic acid and alkali metal cations in solution therewith, a minor proportion of a water-soluble oxygen acid of pentavalent phosphorus, introducing said compounded maleic acid solution into the vapor phase zone of a distillation column in contact with xylene, maintaining the distilland of said distillation column comprising a body of maleic anhydride at a temperature of 200° to 230° C., distilling from said maleic acid solution the gross and hydrate water as a codistillation mixture with said xylene, maintaining a feed rate of maleic acid solution at a rate such that substantially complete dehydration of maleic acid is effected prior to contact with the liquid phase of distillation bottoms, removing water-xylene codistillation mixture from the distillation column, separating water and recycling xylene to said distillation column, and recovering maleic anhydride from the distillation bottoms.

8. A continuous process for converting an aqueous solution of crude maleic acid to maleic anhydride without appreciable decomposition of maleic anhydride, which comprises incorporating into an aqueous solution of maleic acid containing alkali metal cations and an amount of at least 15%, based on said maleic acid, of associated oxidation products a water-soluble oxygen acid of pentavalent phosphorus in amount sufficient to present at least one equivalent acid group per atomic equivalent of alkali metal cation, continuously introducing said compounded maleic acid solution into the vapor phase zone of a distillation column in contact with a water-immiscible, inert, aromatic solvent, at least a portion of which possesses a boiling point in the range of 110° to 185° C., maintaining the distilland of said distillation column comprising a body of maleic anhydride at reflux temperatures, continuously distilling from said maleic acid solution the gross and hydrate water as a codistillation mixture with said aromatic solvent, continuously removing said water-aromatic solvent codistillation mixture from the distillation column, separating water and recycling aromatic solvent to said distillation column, and recovering maleic anhydride from said distilland.

9. A method of stabilizing maleic anhydride against decomposition and isomerization at temperatures above 190° C. in the presence of at least 50 p. p. m. of alkali metal ions, which comprises the addition of an oxygen acid of pentavalent phosphorus to said maleic anhydride in amounts presenting at least one equivalent acid group per atomic equivalent of alkali metal ion.

10. The method according to claim 9, wherein the oxygen acid of pentavalent phosphorus is orthophosphoric acid.

References Cited in the file of this patent

UNITED STATES PATENTS

| | | |
|---|---|---|
| 2,134,531 | Punnett | Oct. 25, 1938 |
| 2,343,536 | Crowell | Mar. 7, 1944 |
| 2,509,873 | McAteer | May 30, 1950 |
| 2,683,110 | Roussean | July 6, 1954 |
| 2,688,622 | Jaquay | Sept. 7, 1954 |